United States Patent [19]

Cabaret et al.

[11] Patent Number: 5,725,338
[45] Date of Patent: Mar. 10, 1998

[54] DRILL BIT HAVING A HEMISPHERICAL HEAD WITH AN EVOLUTIVE CUT

[75] Inventors: Maurice Jean Cabaret, Ponthierry; Christian Thierry Daude, Vaux Le Penil; Daniel Marcel Eugène Lavocat, Ballancourt; Jean Pierre Leboulanger, Chartrettes; Michel Lebrun, Machault; François Masson, Evry; Gilles Rouge, Dourdan; Bernard Gilbert Roy, Volgre, all of France

[73] Assignee: Societe Nationale D'Etude Et De Construction De Moteurs D'Aviation "Snecma", Paris, France

[21] Appl. No.: 780,233

[22] Filed: Jan. 8, 1997

Related U.S. Application Data

[63] Continuation of Ser. No. 354,812, Dec. 8, 1994, abandoned.

[30] Foreign Application Priority Data

Dec. 8, 1993 [FR] France .................. 93 14697

[51] Int. Cl.[6] .................................................. B23B 51/00
[52] U.S. Cl. .................................................. 408/230; 407/54
[58] Field of Search .................. 408/230, 224, 408/227; 407/54, 53, 42

[56] References Cited

U.S. PATENT DOCUMENTS

| | | | |
|---|---|---|---|
| 3,409,965 | 11/1968 | Fisher | 407/54 |
| 3,977,807 | 8/1976 | Siddall | 408/230 X |
| 4,285,618 | 8/1981 | Shanley, Jr. | 408/230 X |
| 4,712,948 | 12/1987 | Kidani | . |
| 4,932,815 | 6/1990 | Krauss | 408/224 |
| 5,186,584 | 2/1993 | Muller et al. | 408/230 X |
| 5,193,943 | 3/1993 | Kim | 407/54 X |

OTHER PUBLICATIONS

DE-U-18 63 075 Gebr. Brasseler, p. 3 line 8, p. 4 line 4, figures 1, 2.

*Primary Examiner*—Andrea L. Pitts
*Assistant Examiner*—Henry W. H. Tsai
*Attorney, Agent, or Firm*—Oblon, Spivak, McClelland, Maier & Neustadt, P.C.

[57] ABSTRACT

The cutting end or head of a helically grooved drill bit is of generally hemispherical shape and has four cutting lips, two of which are disposed in end-to-end relationship at the point S of the bit. The cutting angle of the edge of each lip is evolutive, varying from 0° at the point S to a value, determined experimentally in accordance with the material to be machined, at a position P at the intersection of the cutting edge with the end of the outer diameter d of the bit.

3 Claims, 2 Drawing Sheets

DRILL BIT HAVING A HEMISPHERICAL HEAD WITH AN EVOLUTIVE CUT

This application is a continuation of application Ser. No. 08/354,812, filed on Dec. 8, 1994, now abandoned.

BACKGROUND OF THE INVENTION

1. Field of the Invention

This invention relates to a drill bit suitable for use in difficult working conditions.

2. Summary of the Prior Art

It is conventional and has long been known to use helical drill bits having a plurality of cutting lips for difficult drilling operations. As is known, the lips extend radially from the center of the head of the bit, which is on the axis of the bit, to the periphery of the bit. The cutting edge of each lip is continued towards the outside of the bit by a helical cutting edge or land which is disposed behind, with respect to the direction of rotation of the bit, a helical groove.

For machining some materials, such as those which are often used in aeroengine or turbojet engine applications and which include nickel or cobalt based superalloys or high-alloy steels having high mechanical strength characteristics and elevated hardness, it is also known to replace the material of high speed steel cutting tools by tungsten carbide or a similar material, for example, of ceramic type.

Despite these known improvements and adaptations, one problem has still not been solved satisfactorily in the aforementioned applications. Difficult situations often require several consecutive operations calling for a number of different consecutive tools to drill a bore which complies satisfactorily with the strict criteria imposed inter alia in aeronautical applications. This applies particularly when the surface of the article to be drilled is not disposed in a plane perpendicular to the geometric axis of the subsequent bore or to the tool axis and has, for example, a slope or a rounded fillet or bead or an external chamfer.

SUMMARY OF THE INVENTION

It is an object of the invention to provide a drill bit which is able to cope with such situations satisfactorily and is free from the disadvantages of the previously known solutions.

To this end, according to the invention there is provided a helically grooved drill bit in which the cutting end or head of the bit has a generally hemispherical shape and comprises four cutting lips, two of said lips being disposed in end-to-end relationship at the point of the bit, and the cutting angle of the cutting edge of each lip being evolutive, varying from 0° at the point of the bit on the geometric axis thereof to a value determined experimentally in accordance with the material to be machined at a position (P) where the cutting edge intersects the end of the outer diameter of the bit, the clearance angle preferably also varying in an evolutive manner, but in the opposite sense, from the point of the bit to the said position (P).

Preferably, a variation of the cutting angle from 0° to a value between 10° and 12° is chosen for machining superalloys, and particularly nickel-based or titanium alloys.

Other preferred features and advantages of the invention will become apparent from the following description of one embodiment of the invention, given by way of example, with reference to the accompanying drawings.

DESCRIPTION OF THE PREFERRED EMBODIMENT

Figure 1:
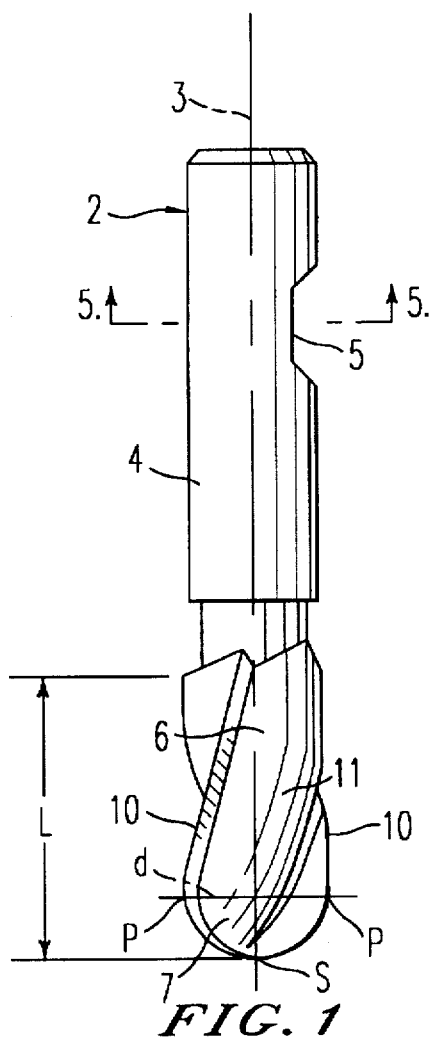
FIG. 1 is a side view of a drill bit in accordance with the invention.

The drill bit shown in FIG. 1 comprises a body made of a tungsten carbide based material and is circumscribed by a cylinder 2 having a geometric axis 3. In this embodiment the material chosen for the bit is suitable for machining superalloy materials, but for machining other materials the bit can be made of a different material such as high speed steel or a ceramic material.

Figure 5:
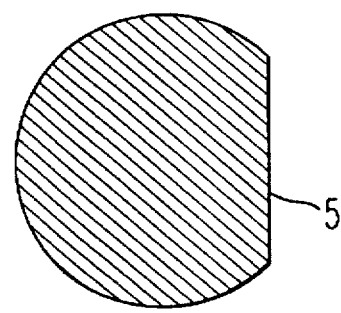
FIG. 5 is a section through the shank of the drill bit, taken on the line 5—5 of FIG. 1.

As is conventional the drill body has a first part forming a shank 4 for engaging the bit in a chuck, and in the example shown the shank 4 has a facet 5, as shown in FIGS. 1 and 5, for locking the tool.

Figure 2:
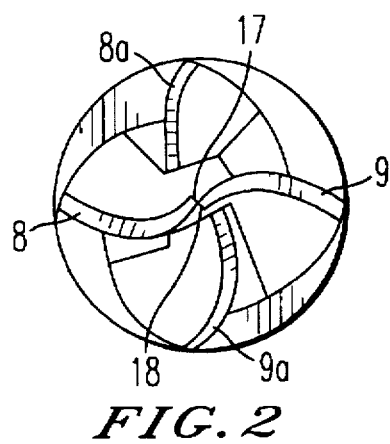
FIG. 2 is a point end view of the drill bit of FIG. 1.
Figure 3:
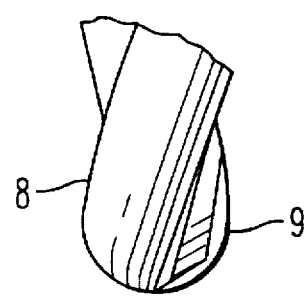
FIG. 3 shows a detail of the cutting part of the drill bit of FIG. 1.

A second part 6 of the bit forms a cutting part defined by the flute length L. The end 7 or head of the cutting part 6 is of a hemispherical shape having a point S disposed on the geometric axis of the bit 1 and a base circle whose diameter d intersects the cylinder circumscribing the cutting part 6 at positions P in the plane of FIG. 1. As FIGS. 1 to 3 show, the bit head 7 has four lips. Two of these lips 8, 9 are disposed in end-to-end relationship at the point S in the manner which is visible in FIG. 2, whereas the other two lips 8a, 9a are separated near the point S.

Figure 4:
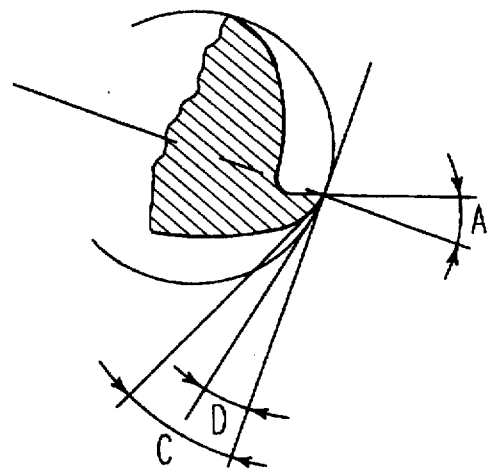
FIG. 4 shows a detail of a cutting edge of the drill bit of FIG. 1.

In accordance with the invention, the cutting angle A of the edge of each of the lips is 0° at the point S and varies in an evolutive manner to a value of 10° at the position P, as indicated in FIG. 4. Similarly and correspondingly, in the example shown the clearance angle D also varies in an evolutive manner, but in the opposite sense, for example from 8° at the point S to 6° at the position P. The undercut angle C may vary, for example from 12° to 20°, according to the bit diameter.

The evolutive value of these angles is determined experimentally to suit the particular application according to the nature of the material to be machined. The values given are suitable for machining superalloy articles, particularly those having a nickel base, or titanium alloy articles.

The cutting edge of each lip is continued over the length L of the cutting part 6 by the cutting edge of a helical land 10, two adjacent lands 10 being separated by a helical groove 11, and the cutting angle preferably retaining the value reached at the position P. The land edge has a zone of approximately 0.2 to 0.3 mm in width serving as a cylindrical reference. In the example shown the helix angle is 30°, but may vary according to the type of material to be drilled.

The drill bit in accordance with the invention as described above with reference to FIGS. 1 to 5 has improved penetration along its geometric axis 3, particularly in conditions in which the geometry of the workpiece surface to be drilled makes it difficult to achieve direct drilling to the required diameter with satisfactory quality. This occurs particularly when the surface to be drilled is inclined relative to the plane perpendicular to the geometric drilling axis or has a bead or chamfer. Drill bits of different dimensions have been made in accordance with the invention, starting from a diameter of 3 mm.

Figure 6:
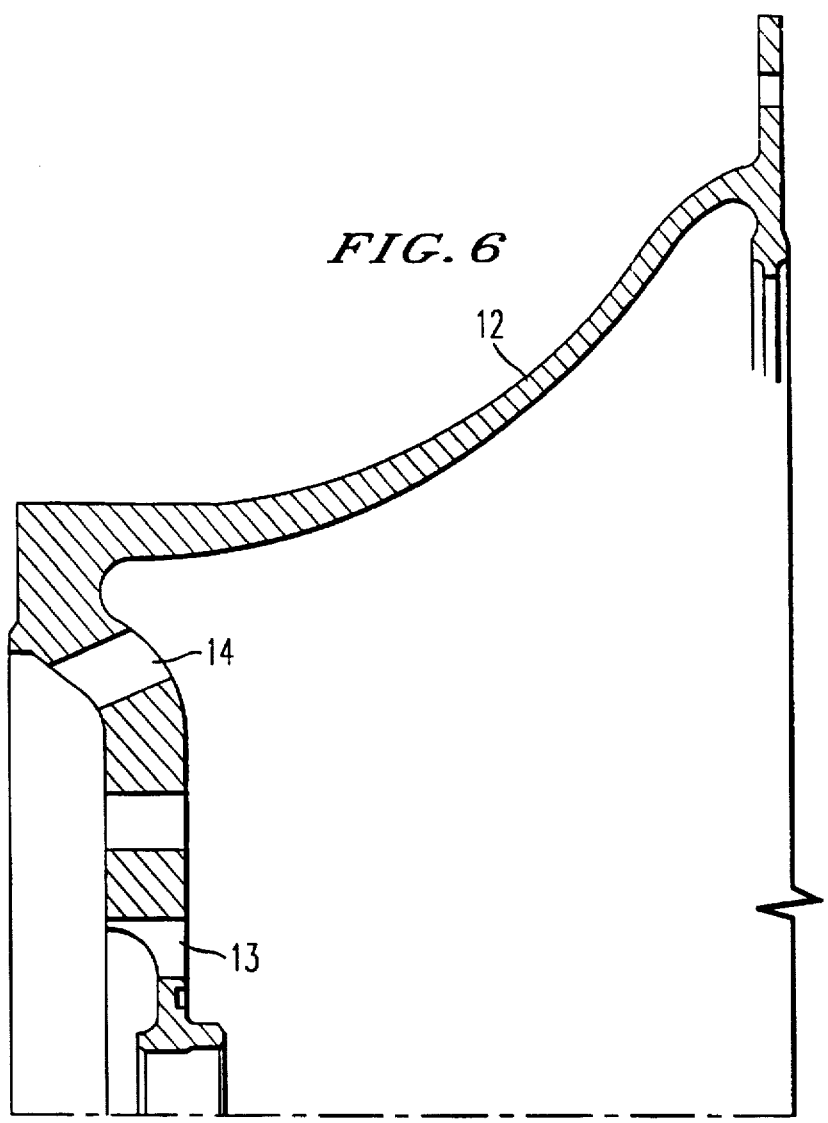
FIG. 6 is a sectional view through part of one example of an article machined with the aid of a drill bit in accordance with the invention; and, FIG. 7 is a view similar to FIG. 6 but of a second example of an article machined with the aid of a drill bit in accordance with the invention.

FIG. 6 shows an example of an application in which a bit in accordance with the invention enables two rows 13, 14 each of 40 holes to be drilled in a single operation in an article 12 which is symmetrical about an axis of revolution, whereas previous methods called for the use of a number of tools and required a working time substantially twice that required using a drill bit in accordance with the invention. The final dimension can be achieved in a single drilling operation while keeping within the required quality criteria, and in particular good geometrical accuracy and a surface finish of Ra 0.9 is achieved.

Figure 7:
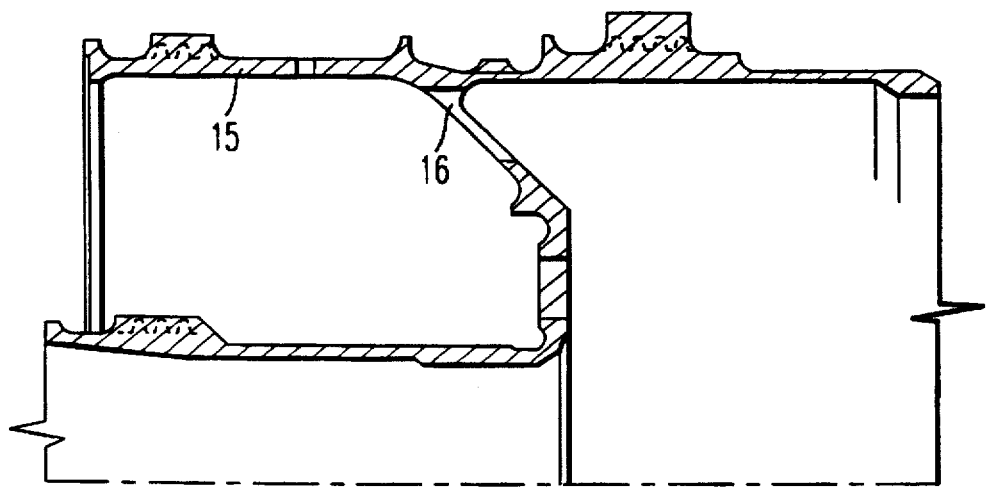

FIG. 7 shows another example in which 24 holes 16 are drilled to final dimensions in a single pass by means of a drill bit in accordance with the invention, and with satisfactory quality results despite the fact that the portion of the article to be drilled is formed by a thin sheet of metal and has a complex surface geometry, including the proximity of an adjacent internal annular surface of the article.

Obviously, numerous modifications and variations of the present invention are possible in light of the above teachings. It is therefore to be understood that within the scope of the appended claims, the invention may be practiced otherwise than as specifically described herein.

We claim:

1. A helically grooved drill bit defining a longitudinal axis and having an outer diameter at an end portion of the bit, said drill bit having a cutting end which has a generally hemispherical shape, said cutting end defining a point of said bit on said longitudinal axis and having four cutting lips, two of said cutting lips being disposed so as to have an offset end-to-end relationship at said point of said bit, and each of said cutting lips having a cutting edge defining a cutting angle which is evolutive, varying from 0° at said point of said bit to a value predetermined in accordance with the material to be machined at a position where said cutting edge intersects said outer diameter of said bit, and a clearance angle which varies correspondingly, but in the opposite sense, from said point of said bit to said position.

2. A drill bit according to claim 1 for machining metallic materials, wherein said cutting angle at said position (P) is from 10° to 12°.

3. A drill bit according to claim 2, wherein said metallic materials comprise superalloys.

\* \* \* \* \*

UNITED STATES PATENT AND TRADEMARK OFFICE
CERTIFICATE OF CORRECTION

PATENT NO.   : 5,725,338
DATED        : March 10, 1998
INVENTOR(S)  : Maurice J. CABARET et al It is certified that error appears in the above-identified patent and that said Letters Patent is hereby corrected as shown below:

Column 2, line 33, change "bit 1" to --bit--.

Signed and Sealed this

Twenty-ninth Day of September, 1998

Attest:

BRUCE LEHMAN

Attesting Officer

Commissioner of Patents and Trademarks